April 19, 1927.
F. L. REQUA
1,625,282
REGULATION OF ELECTRIC CIRCUITS
Filed Jan. 30, 1922
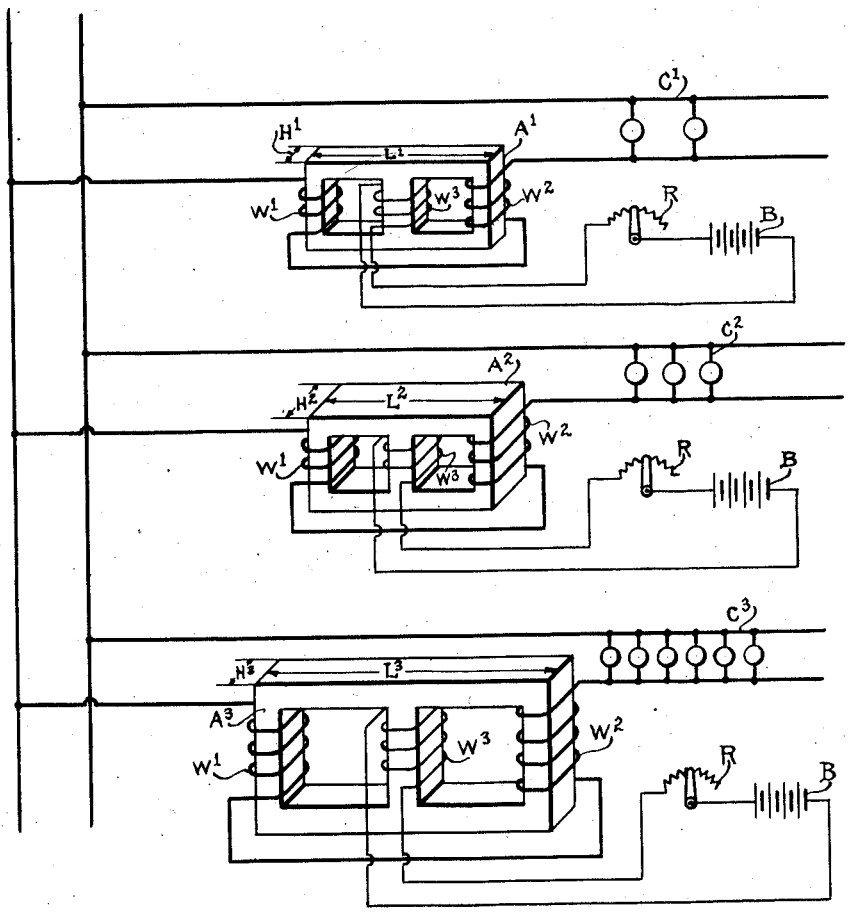
INVENTOR.
Frederick L. Re Qua
BY
ATTORNEY Patented Apr. 19, 1927.

1,625,282

UNITED STATES PATENT OFFICE.

FREDERICK L. RE QUA, OF MILWAUKEE, WISCONSIN, ASSIGNOR TO THE CUTLER-HAMMER MFG. CO., OF MILWAUKEE, WISCONSIN, A CORPORATION OF WISCONSIN.

REGULATION OF ELECTRIC CIRCUITS.

Application filed January 30, 1922. Serial No. 532,711.

This invention relates to regulation of electric circuits and while adapted to numerous uses, is particularly applicable to energization and intensity control of a multiplicity of lighting or other load circuits.

In numerous installations, as in the illumination of theatres and the like, wherein it is necessary to effect energization and intensity control of a multiplicity of load circuits which differ from one another widely in energy consumption, it is essential or exceedingly desirable to provide for effecting such control through variation of electrical conditions such as currents or voltages of lesser magnitude than those involved in the load circuits and also to provide standard apparatus for so controlling the load circuits with uniformity irrespective of the different values of energy consumption of such individual circuits.

The present invention has among its objects that of accomplishing the foregoing desiderata.

Another object is that of simplifying and facilitating the energization and intensity control of a multiplicity of load circuits which may vary widely from one another in energy consumption.

Another object is that of effecting such co-ordination proportioning and standardization of certain individual control elements, or parts thereof, for such circuits as to enable standardization and interchangeability of other elements involved in the control.

Another and more specific object is that of enabling the use of a single type and capacity of rheostat or other current limiting device for controlling the intensity of energization of a multiplicity of circuits carrying widely different loads while providing substantially similar characteristics of control of all load circuits.

According to the present invention it is proposed to utilize individual regulable reactors for control of the several load circuits said reactors being specially designed, calibrated and co-ordinated to one another in ways and for purposes hereinafter described.

The accompanying drawing, consisting of a single figure, illustrates diagrammatically certain physical features of the invention.

In the drawing are illustrated lamp circuits $C'$, $C^2$ and $C^3$, typifying a multiplicity of load circuits to be controlled, said circuits to be supplied from a common A. C. source and differing from one another in energy consumption as indicated by the different numbers of lamps in the individual circuits.

Said circuits are provided with control means comprising individual reactors having laminated core structures $A'$, $A^2$, $A^3$ each having A. C. windings $W'$ and $W^2$, and a control or pilot winding $W^3$. Said pairs of A. C. windings are illustrated as being connected in series with one another in their respectively associated load circuits, although obviously this precise arrangement is not essential, whereas each of the windings $W^3$ is adapted to be energized from a suitable source of unidirectional current such as battery B or from a source of alternating current of lower frequency than that of the main supply lines. The circuit of each of the windings $W^3$ also includes a resistance varying rheostat R.

Thus, assuming suitable design and proportioning of the aforedescribed elements, when the winding $W^3$ of any reactor is unenergized the impedance due to the A. C. flux serves to check the supply of energy to the lamps of its associated circuit to such an extent that the lamp filaments remain black. However, upon manipulation of the associated rheostat R to increase and subsequently vary the excitation of the winding $W^3$ the impedance is reduced and controlled, whereby the energy supplied to the lamps and consequently the intensity of illumination of the latter may be varied at will between zero and maximum. Moreover the energy thus required to so control the supply of A. C. energy is relatively slight whereby the rheostats R and the parts directly associated therewith may be of correspondingly simplified construction and reduced size and capacity.

Control systems as thus typified are particularly applicable in illumination control of theatres and the like where a multiplicity of individually controllable lamp load circuits is required and where the number of lamps supplied by the individual circuits will ordinarily vary greatly, whereby the circuits may differ from one another in the value of energy to be supplied thereby between relatively wide limits, as for example 300 or 400 watts, on the one hand, and 20,000 watts or more on the other hand.

Thus for purposes of efficiency, economy and the like, it is desirable to provide for each load circuit a particularly designed reactor whose capacity and other characteristics best adapt the same to the requirements of that individual circuit. However, I have determined both theoretically and practically that, as regards core structure, the particular design or shape which by reason of efficiency in operation and facility and economy of construction is preferable for any individual circuit will be also preferable for all circuits having similar load characteristics although differing in capacity.

Moreover, I have found that where the required difference in capacities of several reactors is within certain limits, such differences may be provided, and the efficiency of the reactors substantially maintained, by merely varying the stacking height, that is to say, the number of laminations of the several core structures, the individual laminæ being all of equal corresponding dimensions.

By the foregoing expedients all the reactor core structures required for control of a given range of load circuits, however extended, may be constructed from geometrically similar laminations whereas the number of different sizes of laminæ required may be very materially reduced, with corresponding increase in economy and facility of manufacture.

Thus while it might be possible to design and construct a single type and size of core structure capable of answering the requirements of an entire range of load circuits, such practice would obviously be highly uneconomical and inefficient both in construction and operation since all the core structures except that associated with the circuit supplying the highest wattage would be oversize to a greater or lesser degree, whereas the designing of coils for the reactors would be very materially complicated and also a corresponding waste of coil material would be involved.

However, I have discovered that a given range of load circuits having reactors whose cores are designed and constructed as hereinbefore described may be adequately and similarly controlled by means of a single type, size and capacity of rheostat or other resistance varying device for varying the direct current energization of the several reactors, provided the coils of said reactors be designed and proportioned in accordance with the laws hereinafter set forth.

Considering now the several core structures illustrated in the drawing, it is apparent that, neglecting thickness of material, the corresponding laminæ of which the same are composed are all geometrically similar and that, neglecting the number of said laminæ, the core structures themselves are likewise similar and hence may be represented by a corresponding dimension of each such as the horizontal lengths $L'$, $L^2$, $L^3$.

Again it is seen that the values of energy consumed in circuits $C'$ and $C^2$ do not differ widely and hence the dimensions $L'$ and $L^2$ of the respective core structures $A'$ and $A^2$ are the same, or in other words the laminations of which these cores are constructed are alike both in contour and in size, the cores differing merely in stacking height, that is to say, in number of laminations employed, as represented by the relative dimensions $H'$ and $H^2$. The core structure $A^3$ on the other hand, which is designed to furnish a much higher value of electrical energy as indicated by the larger number of lamps in the circuit $C^3$, is composed of larger laminations indicated by the increased length of dimension $L^3$. These laminations, however, are as aforestated geometrically similar to those of the other core structures.

Considering now the design of the various windings, it should first be observed that where, as is usually the case, it is necessary or desirable that for all the reactors similar percentages of the maximum D. C. excitation shall determine values of transmitted A. C. energy which for all the reactors shall bear the same percentage relation to the respective maximum values, the flux densities in the cores of all the reactors shall be equal under like percentage values of the total or maximum D. C. excitation.

Thus, since the shape of the curve representing the relation between the current through the A. C. coils and the current through the D. C. coil is dependent upon the shape of the magnetization curve of the material of the magnetic circuit and upon the frequency of the alternating current, it follows, in accordance with known laws of transformer construction, involving voltage, frequency, number of turns and total flux, that for any given A. C. load upon the reactor, expressed as a percentage of its full load rating, the value of the counter E. M. F. in the A. C. coils divided by the product of the number of turns and the cross sectional area of the flux path in iron of the core must, under similar conditions of impressed voltage, frequency and the like, be the same in all the reactors.

Also since the impressed voltage and frequency are assumed to be constant, it further follows that under ideal conditions the number of turns on the A. C. windings required to effect the foregoing desired relation will vary inversely as the cross sectional area of the flux path in iron of the core. Also to maintain the requisite similarity of operative characteristics, it is necessary that the number of A. C. ampere turns per unit distance of linear travel of the A. C. flux in the core be equal in all the reactors for similar percentages of the A. C. full load rating.

From the foregoing it results that for a fixed value of the dimension L the aforementioned cross sectional area of the core varies directly as the value of the stacking height H, hence N, the required number of A. C. ampere turns will vary inversely as H and the full load rating of the reactor will vary directly as the value of N. Where H is constant and L varies, N will vary inversely as L and the full load rating of the reactor will vary directly as the second power of L. Where both L and H vary but are continuously proportional to one another N will vary inversely as the second power of L and the reactor full load rating will vary directly as the third power of L.

In order that the D. C. coils may all consume the same current at given voltage and still fulfill the aforesaid requirements of the A. C. circuits of the several reactors, it is necessary that the D. C. resistance remain constant for all values of L and H. Also in order that the ampere turns per inch of linear travel of the D. C. flux shall be the same for like percentages of the full load rating of the several reactors, it is necessary that the quotient of the number of ampere turns of the D. C. coils or NI, divided by L be the same in all cases. The stacking height H may vary independently of NI since the former has no effect upon the length of path of the D. C. flux.

The foregoing construction and arrangement thus provide for complete standardization as regards the D. C. elements of the several reactors and for the maximum degree of standardization of the A. C. elements and core structures thereof which is compatible with efficient construction and operation, while providing simple and positive methods of and means for determination of all the necessary factors.

What I claim as new and desire to secure by Letters Patent is:

1. The combination with a plurality of load circuits which differ from one another in capacity, of regulating means for said circuits comprising individual reactors therefor, variable with varying individual control currents of lower frequency than that of the load currents, said reactors being so designed as to produce like regulative effects when subjected to influence of like values of control current.

2. The combination with a plurality of load circuits which differ from one another in capacity, of regulating means for said circuits comprising individual reactors variable with varying individual control currents of lower frequency than that of the load currents, said reactors being so designed as to produce like regulative effects when subjected to influence of like values of control current, and interchangeable devices for varying the value of such control currents individually.

3. Regulating apparatus for a plurality of load circuits which differ from one another in capacity, comprising individual reactors for said circuits, variable with varying individual control currents of lower frequency than that of the load currents, said reactors having their core members substantially similar to one another geometrically and having their windings designed and proportioned to provide like regulative effects of all the reactors upon their respective load circuits when subjected to influence of like values of control current.

4. Regulating apparatus for a plurality of load circuits which differ from one another in capacity, comprising individual reactors for said circuits, variable with varying individual control currents of lower frequency than that of the load currents, said reactors having their core members substantially similar to one another geometrically and having their control windings designed to provide like values of impedance to the several control currents and their power windings designed and proportioned to provide like regulative effects of all the reactors upon their respective load circuits when subjected to influence of like values of control current.

5. Regulating apparatus for a plurality of load circuits which differ from one another in capacity, comprising individual reactors for said circuits, variable with varying individual control currents of lower frequency than that of the respective load currents, said reactors having their core members substantially similar to one another geometrically and having their windings designed and proportioned to effect for all the reactors a common relation of power flux to control flux under all conditions of like control energization of all the reactors.

6. Regulating apparatus for a plurality of load circuits which differ from one another in capacity, comprising individual reactors for said circuits, variable with varying values of individual control energization, said reactors being so designed as to provide for all the reactors equal percentage variations in reactance when subjected to equal percentage changes in the individual control magnetomotive forces.

7. Regulating apparatus for a plurality of load circuits which differ from one another in capacity, comprising individual reactors for said circuits, variable with varying values of individual control energization, said reactors being so designed as to provide for all the reactors equal percentage variations in reactance when subjected to equal percentage changes in current in the individual control circuits.

In witness whereof, I have hereutno subscribed my name.

FREDERICK L. RE QUA.